No. 814,476. PATENTED MAR. 6, 1906.
C. REED.
MOLDING MACHINE.
APPLICATION FILED MAR. 13, 1905.
5 SHEETS—SHEET 1.
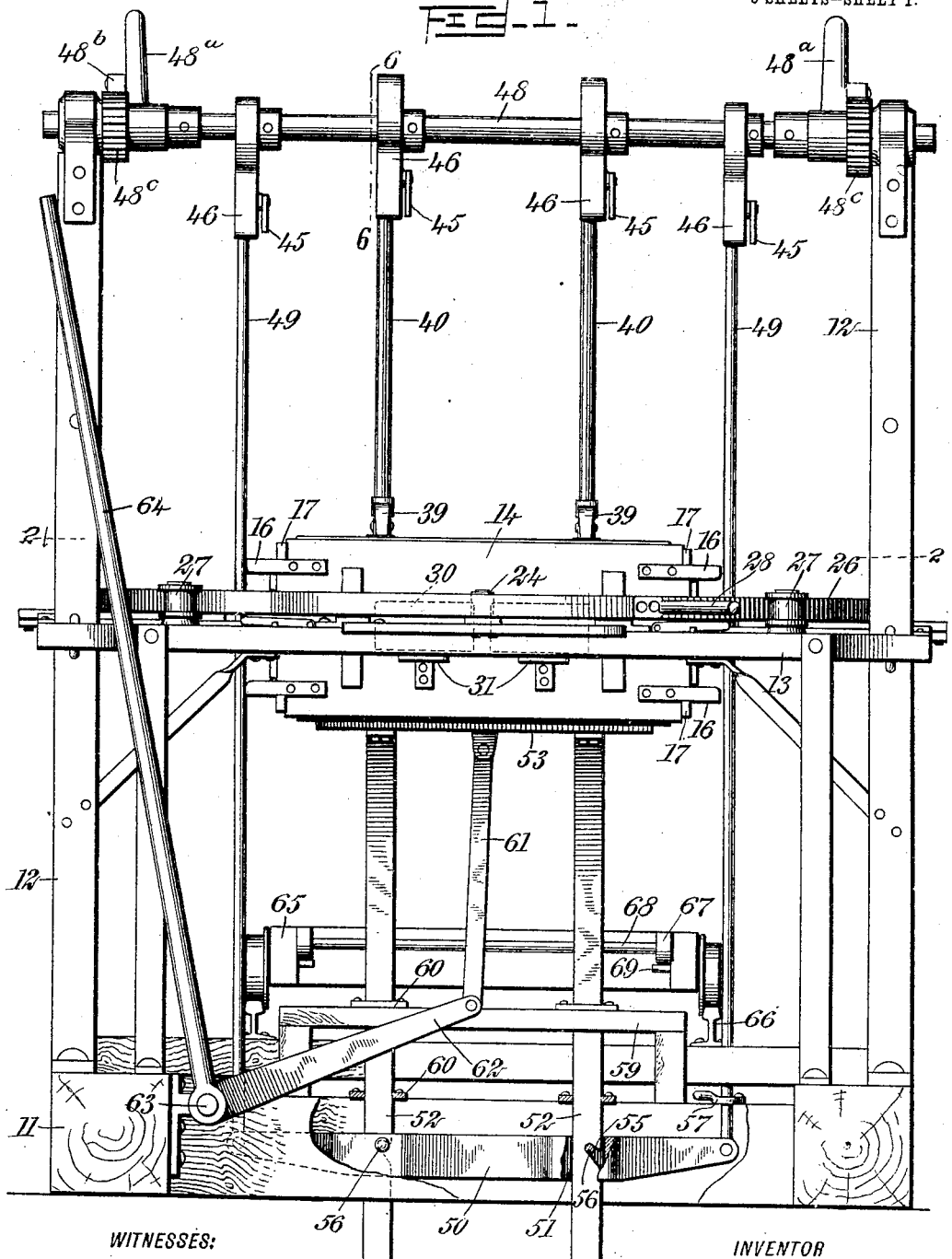
WITNESSES:
La Gunford Handy
A. E. Fay
INVENTOR
Charles Reed
BY
ATTORNEYS

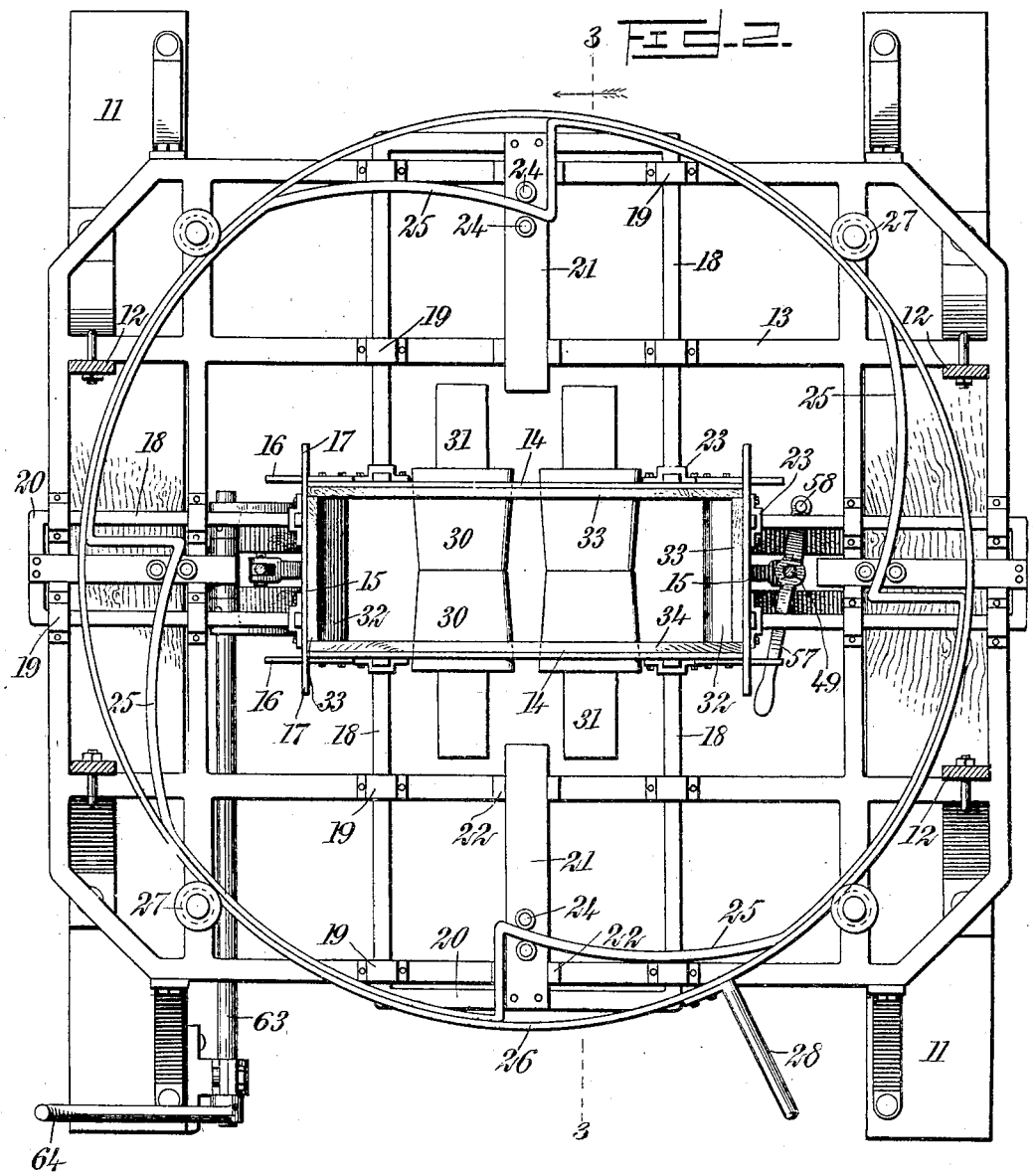

No. 814,476. PATENTED MAR. 6, 1906.
C. REED.
MOLDING MACHINE.
APPLICATION FILED MAR. 13, 1905.
5 SHEETS—SHEET 3.
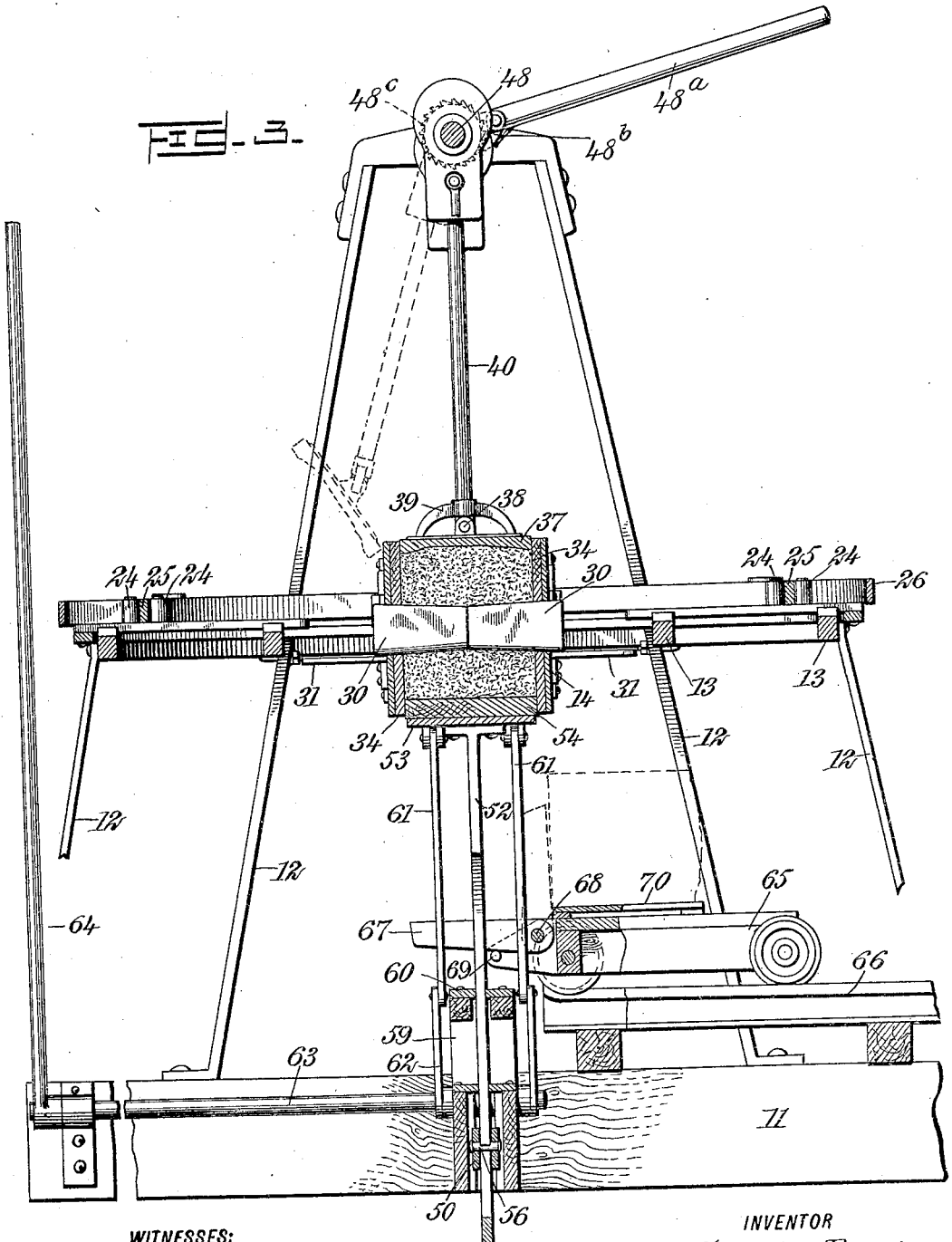
WITNESSES:
INVENTOR
Charles Reed
BY
ATTORNEYS No. 814,476. PATENTED MAR. 6, 1906.
C. REED.
MOLDING MACHINE.
APPLICATION FILED MAR. 13, 1905.
5 SHEETS—SHEET 4.
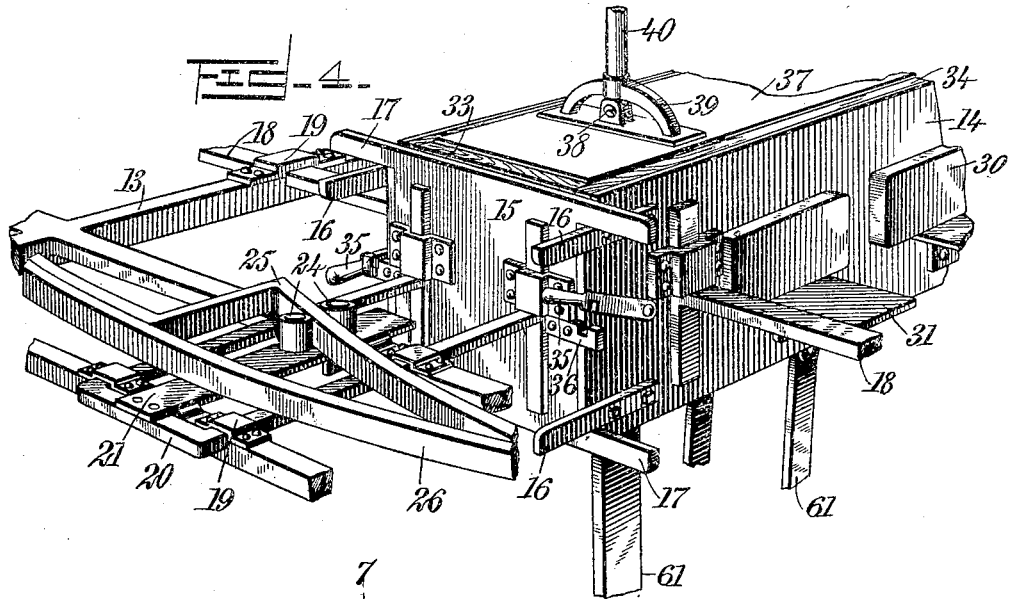
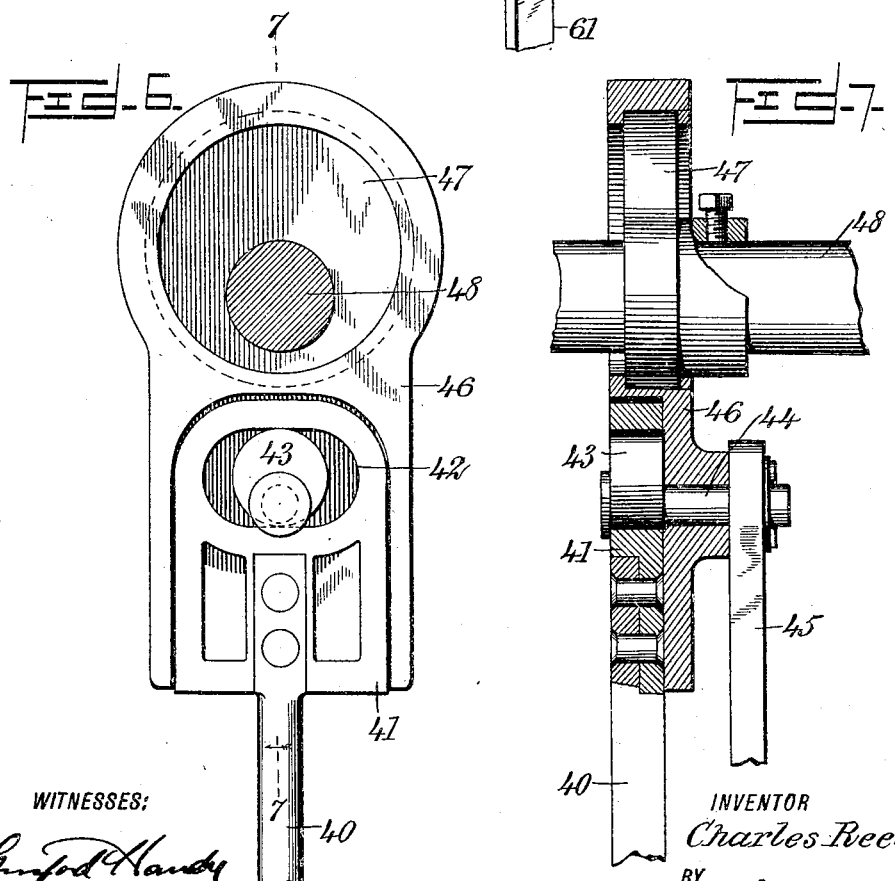
WITNESSES:
INVENTOR
Charles Reed
BY
ATTORNEYS No. 814,476. PATENTED MAR. 6, 1906.
C. REED.
MOLDING MACHINE.
APPLICATION FILED MAR. 13, 1905.
5 SHEETS—SHEET 5.
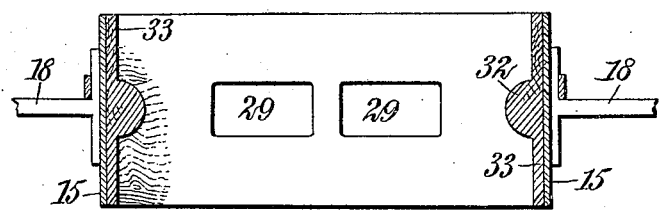
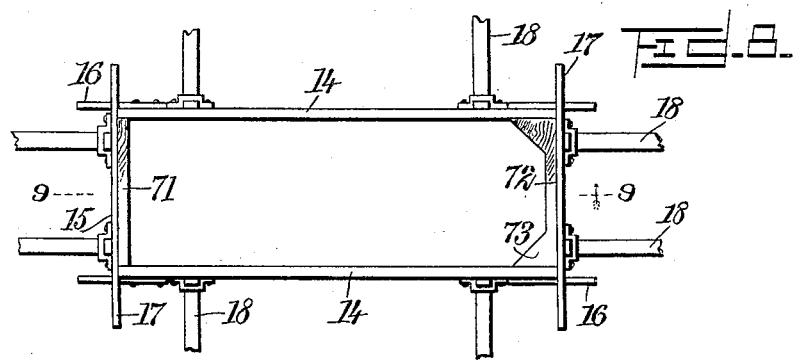
WITNESSES:
INVENTOR
Charles Reed
BY
ATTORNEYS

UNITED STATES PATENT OFFICE.

CHARLES REED, OF PORTLAND, INDIANA.

MOLDING-MACHINE.

No. 814,476.  Specification of Letters Patent.  Patented March 6, 1906.

Application filed March 13, 1905. Serial No. 249,772.

*To all whom it may concern:*

Be it known that I, CHARLES REED, a citizen of the United States, and a resident of Portland, in the county of Jay and State of Indiana, have invented a new and Improved Molding-Machine, of which the following is a full, clear, and exact description.

My invention relates to molding-machines capable of making building-blocks and other articles from artificial stone, concrete, and plastic substances in general.

The principal objects of my invention are to provide for efficient and rapid adjustment of the working parts of the machine; to provide for pressing the molding material from two opposite directions, so as to make the article solid all through and to make the material completely fill the corners and the spaces around the cores; to provide an entirely automatic arrangement, so that neither the product nor any part of the machine will have to be lifted before the molded article is completed; to provide for an efficient and convenient delivery of the article to a truck by which it can be taken away from the machine, and to provide for making all kinds of articles that can be molded by machinery and especially all kinds of building-blocks.

Further objects of the invention will appear in the course of the subjoined description.

Reference is to be had to the accompanying drawings, forming a part of this specification, in which similar characters of reference indicate corresponding parts in all the figures.

Figure 1 is a front elevation of a molding-machine embodying my present improvements, partly broken away to show interior construction. Fig. 2 is a horizontal sectional view of the same on the line 2 2 of Fig. 1. Fig. 3 is a sectional view on the line 3 3 of Fig. 2. Fig. 4 is a fragmentary perspective view. Fig. 5 is a longitudinal sectional view of a mold preferably used on my machine.
Fig. 6 is a sectional view on an enlarged scale on the line 6 6 of Fig. 1. Fig. 7 is a sectional view on the line 7 7 of Fig. 6. Fig. 8 is a plan view of a mold which can be used on my machine and comes within the scope of my invention provided with means for forming shingles. Fig. 9 is a sectional view on the line 9 9 of Fig. 8. Fig. 10 is a plan view of a top plate used in the form of mold shown in Figs. 8 and 9, and Fig. 11 is a perspective view of a metal plate or palette used when making shingles.

Upon the base 11 of the frame uprights 12 are placed for the support of the main portion of the machine. Connected with these uprights near the central part thereof is a frame 13, consisting of bars extending across the machine in both directions and adapted to support the mold, which preferably consists of walls 14 and 15, constituting its sides and ends, respectively. These walls are separable one from another, and in order that they may be separated on parallel lines they are provided with guide-pieces 16 and 17, respectively. One pair of these guide-pieces at each corner are preferably located outside the other pair, so that one wall of the mold will be supported by the other through these guide-pieces and prevented from receiving any vertical movement independent of the adjacent walls. In order to separate the walls, each is connected with a sliding member 18, passing through guides 19 upon the frame 13 and having a yoke 20 at its outer end. This yoke is provided with a slide 21, extending toward the center of the machine and in turn guided by guides 22 on the frame 13. The sliding members connected with the four walls are substantially the same in construction, although having different dimensions according to the size of the walls, and they are connected with the walls by means of brackets 23. For the purpose of operating them simultaneously each sliding member is provided with a pair of rollers 24. (Shown in the present instance as mounted on the slides 21.) Engaging with each of these pairs of rollers is a cam 25, preferably constructed in the form of a curved bar and secured to a circle 26, movably mounted upon the frame 13. Rollers 27 are provided for guiding and helping to support the circle. The circle is also provided with a handle 28 for oscillating it. It will be readily understood that the oscillation of the circle will operate to open and close the mold by reciprocating its side and end walls simultaneously and proportionately. The purpose of this is to free the molded block from the mold. The side walls are preferably provided with perforations 29, sufficient in number to accommodate the number of cores needed for the production of the desired number of indentations in the article to be molded. These perforations instead of being formed in the usual manner by cores passing from one side of the mold to the other are each formed by two cores 30, extending part way in from opposite sides of the mold. These two cores are preferably tapered from their outer ends to their inner ends, and it is usually desirable to have them meet near the center of the mold. The side walls 14 are also provided with shelves 31 beneath the perforations 29 for the support of these cores when they are withdrawn from the mold. It will be seen that a great advantage is obtained by these cores over the ordinary method of molding, as they can be more readily withdrawn without damaging the walls of the molded article and when broken can be readily removed and replaced.

In order to form a groove or indentation of any character in the ends of the molded article, the end walls are provided with projections 32, extending into the mold and forming the desired configuration upon the plastic material therein. These projections may be formed on end lining-blocks 33 and can be made of any desired shape and character and are preferably fixed with respect to the end walls 15, so that they are removed from the molded article when the end walls are drawn back. When fixed in this manner, they should preferably be not deeper than the stroke of the end walls. The walls of the mold, if desired, can be provided with side lining-blocks 34, which, like the blocks 33, can be provided with any configuration, so as to leave the molded articles with projections and indentations or a roughened surface, as may be convenient.

In order to lock the mold in its closed position when the parts are ready for molding, latches 35 are provided upon two of the mold-walls and corresponding catches 36 for them upon the other ones.

The top of the mold is preferably formed of a plate 37, pivotally mounted by means of a bolt 38 upon an operating-rod 40. A yoke 39 is rotatably mounted on the rod 40 to hold the plate in stationary position with respect to said rod. This rod is preferably rigidly connected with a block 41, in which is an oblong or elliptical opening 42. In this opening works a cam 43 upon a shaft 44, which is provided with a handle 45 for turning the cam. This shaft is supported by an eccentric-strap 46, connected with an eccentric 47 upon a shaft 48, which is the main shaft of the machine. This shaft may be rotated or oscillated by handles 48$^a$, carrying pawls 48$^b$, adapted to engage with ratchets 48$^c$ on the shaft. It will be seen that the rotation of the shaft 48 will through the operation of the eccentric 47 reciprocate the rod 40, and consequently cause the plate 37 to press the molded material or to be withdrawn from the mold, as desired. The office of the cam 43 is to adjust the length of the rod 40, so that the proper amount of compression can be provided for.

Fig. 3 shows in dotted lines the position of the plate 37 when swung outwardly from the mold on the shaft 48 as a center and with the plate also swung upon its pivot 38. It will be seen that the plate is pivoted upon a movable axis to provide for this double motion. The plate 37 is preferably provided with a plurality of rods 40, each being furnished with all the connections mentioned above. Another pair of rods 49, also provided with the connections shown in Figs. 6 and 7, are operable from the shaft 48 in a similar manner. The eccentrics with which these rods are connected, however, are mounted at an angle of one hundred and eighty degrees from the other eccentrics, so that when the rods of one pair are up those of the other pair will be down.

At the bottom of the rods 49 is supported a bar or bridge-tree 50. This bar is provided with a pair of transverse passages 51, through which pass rods 52, connected with a bottom plate 53, which supports a palette 54, that is intended to be included between the side and end walls of the mold and constitute the bottom and lower press-plate therefor. The rods 52 are provided with upwardly-inclined notches 55, in which are adapted to engage pins 56, mounted in the slots 51. The slots 51 are broad enough to permit the bars 52 to occupy different positions therein, so that when the bridge-tree is moved from the position shown in Fig. 1 to the right the rods 52 can slide freely through these slots to the left of the pins 56. When, however, the bridge-tree is moved to the position shown in Fig. 1, the pins will quickly engage the notches and therefore the bridge-tree will support the rods and consequently the palette. When the parts are in this position, the rods 49 upon the rotation of the shaft 48 will cause the bridge-tree and palette to rise in the mold and create a pressure upon the material therein. Owing to the opposite location of the two sets of eccentrics this operation will occur simultaneously with the downward pressure exerted by the press-plate 37. For moving the bridge-tree to the right and left to accomplish this result a lever 57 is provided. This lever is pivoted at 58 to one of the supports 11 and is pivotally connected to the rod 49. A frame 59 is mounted on one of the supports 11 and is provided with guides 60 for the rods 52 in order to insure their operation in an entirely vertical manner. In order to manipulate the bottom plate independently of the operation of the rods 49, it is connected by links 61 with a lever 62, pivoted to a rod 63, mounted on the support 11, and provided with an operating-handle 64. The operation of this part of the device will be obvious. When the molded article is completed, the core is withdrawn and the mold separated. The article is lowered by means of the operating-lever 64, so as to deposit the palette 54 and article supported thereby upon a truck 65. This truck runs upon tracks 66 to a position near the center of the machine, where a skeleton shelf 67 upon the truck can be placed under the mold. This shelf is pivoted by a shaft 68 to the truck and is adapted to be held in horizontal position by pins 69. Owing to the fact that this shelf is not provided with any cross-bars, the bottom plate and its supporting members can pass between its outside parts, leaving the palette to be supported by them. Thus the palette is freed from all its supporting members and it is left upon this shelf, carrying the molded article.

A plate 70 is removably mounted upon the truck and is designed to be placed against the side or end of the molded article when the latter is on its palette and supported by the shelf. The shelf is then rotated about its axis 68, carrying with it the palette, plate, and molded article to the position shown in dotted lines in Fig. 3. The palette can then be removed from the molded article and used over again in the mold. This provides for a decrease in expense for palettes, as the plates 70 can be formed of such materials and in such a manner as to provide for supporting the product of the machine while being dried and do not have to be formed in as exact and well-made a manner as the palettes used in the mold.

Referring now to Figs. 8, 9, 10, and 11, I will describe a mold which can be employed on my machine for making shingles or other similar articles. This mold is provided with the same sides and ends 14 and 15, respectively, as in the other case, except that the sides 14 are not perforated. Instead of the plates 33 end plates 71 and 72 are provided, the former being plain and the latter having projections 73 for cutting off the corners of the molded articles and providing the desired shape for shingles. A series of separating-plates 74 are provided, each being of the desired shape of the shingle and each preferably having a pair of projections 75, suitably shaped for the formation of nail-holes. A top plate 76, having projections 77, in which rods 78 are pivoted, is provided and the bottom plate 53 with the palette 54 are used as in the other case. In the operation of forming shingles a plate 74 is placed upon the palette, then sufficient molding material to form the shingle is placed above it, and another plate is then superposed upon the molding material. The mold is then built up with plates and molding material alternating, as shown in Fig. 9, until the mold is filled, and then it is compressed in the same manner as the mold of the other form. It will of course be understood that many forms of molds may be employed in my machine and that articles of various characters can be molded therein.

I will now describe the operation of molding a hollow building-block upon the machine illustrated in Figs. 1 to 7, inclusive. In the first place the mold is thrown open by moving the lever 28 to such a position that the rollers 24 will engage the cam 25 near the outside of the circle. The bottom plate is then let down by the lever 64, the lever 57 having previously been operated to free the rods 52 from the pins 56. The truck being in the position shown in full lines in Fig. 3, the bottom plate will pass down below the shelf 67. The palette is placed on the shelf and the lever 64 reversed, so as to move the bottom plate carrying the palette to a position sufficiently high to be included between the lower edges of the side and end walls of the mold. The bridge-tree is then swung by the lever 57 into such a position that the pins 56 will bear against the right-hand edges of the rods 52 and enter the slots 55 as soon as they come opposite the pins. The lever 64 is then released, and it will be seen that the bottom plate and palette rest upon the bridge-tree. The lever 28 is then operated in the reverse direction to close the mold about the palette, and the latches 35 are operated to lock the sides and ends together. The top press-plate is then thrown to one side, as shown in dotted lines in Fig. 3, the cores are pulled out upon the shelves 31, and the mold is filled half-full of molding material. The cores are then slid into the mold, so that their inner ends meet, and the filling of the mold is completed. After the top plate is swung back upon the top of the mold the cams 43 are adjusted so as to give the necessary compression, or this adjustment can be made permanent if the articles to be molded are of the same size and shape and formed of the same character of molding material. The shaft 48 is then revolved by means of the ratchets and the two press-plates forced toward each other in an obvious manner. This presses the block equally in every direction from the outside. In order to separate the block from the machine, the cores are first pulled out on the sides, the mold unlocked, and the mold-walls pulled apart by means of the handle 28 and circle 26. This leaves the block on the palette, the latter being supported by the bottom plate. The lever 57 is then operated to release the rods 52 from the pins 56, the lever 64 being grasped by one hand and then operated to lower the bottom plate upon the shelf 67. As the bottom plate passes through the shelf the palette will be left upon it, and the molded block may then be thrown over upon the plate 70, as shown in dotted lines in Fig. 3, and the palette restored to the shelf 67, from which it can be picked up by the bottom plate as it returns to molding position.

It will be readily understood that by the construction of a molding-machine either in the form shown or in any other form so long as it falls within the scope of my invention as expressed in the appended claims all the advantages and objects set forth above will be attained, as well as many others. For example, facing on two sides and on both ends of the mold at the same time can be provided for by the use of the side and end pieces 33, 34, 71, and 72 or other plates of any desired construction. Moreover, the construction of shingles is greatly facilitated and no alterations have to be made in the machine itself to accomplish this purpose.

All parts of the machine are simple and can be constructed in a strong and rigid manner, so that they will not be liable to get out of order and can be easily repaired, as well as cheaply constructed and maintained.

Having thus described my invention, I claim as new and desire to secure by Letters Patent—

1. A molding-machine, comprising a press-plate, means for movably supporting said plate, means for adjusting the supporting means comprising a cam engaging the supporting means, and means for reciprocating the supporting means.

2. A block-molding machine, comprising a press-plate, means for movably supporting it to swing about a movable axis, means for adjusting the supporting means comprising a cam engaging the supporting means, and means for reciprocating the supporting means.

3. A molding-machine, comprising a pair of press-plates, one of them being swingingly mounted, and means for simultaneously reciprocating the plates in opposite directions; said means comprising a shaft, and eccentrics on the shaft connected with each of the press-plates and located at an angle of one hundred and eighty degrees from each other.

4. A molding-machine, comprising a press-plate, a rod, means for pivotally supporting the press-plate on the rod, and means for pivotally mounting the rod.

5. A molding-machine, comprising a press-plate, a rod, means for pivotally supporting the press-plate on the rod, means for pivotally mounting the rod, and means for adjusting the position of the rod longitudinally.

6. A molding-machine, comprising a press-plate, a rod adapted to guide the press-plate in a straight line, a supporting-bar having means for engaging said rod and supporting it, and means for reciprocating said bar.

7. A molding-machine, comprising a press-plate, a rod rigidly connected therewith and adapted to guide it in a straight line, said rod being provided with a slot, a supporting-bar having means for engaging said slot, and means for reciprocating said bar.

8. A molding-machine, comprising a press-plate, a guide-bar therefor, a movable bridge having means for engaging said bar, and means for disengaging the bar from the bridge.

9. A molding-machine, comprising a mold, a press-plate located below the mold and movable upwardly to the mold, a track located adjacent to the path of the press-plate, and a truck on the track having a supporting device movable into the path of the press-plate to receive the molded article therefrom.

10. A molding-machine, comprising a pair of press-plates, means for simultaneously moving them toward each other, independent means for moving one of them toward the other, a track located adjacent to said first-mentioned means, and a truck located on the track and adapted to move into the path of movement of one of said press-plates.

11. A molding-machine, comprising a press-plate, means for reciprocating it, a track located adjacent to the path of movement of the press-plate, and a truck movably mounted upon said track; said truck being provided with a pivoted shelf adapted to move into the path of the press-plate, and means for supporting the shelf in a position transverse to said path.

12. In a molding-machine, the combination of means for producing a molded article, and means for removing said article from the producing means, comprising a movable plate for receiving the molded article, a track adjacent thereto, and a truck adapted to run on the track, said truck having a shelf provided with two side pieces and having a space between them for the passage of the plate.

13. In a molding-machine, the combination of means for producing a molded article, and means for removing said article from the producing means, comprising a movable plate for receiving the molded article, a track adjacent thereto, and a truck adapted to run on the track, said truck being provided with a shelf pivotally mounted thereon, said shelf comprising two side pieces with a space between them for the passage of the plate, and the truck having means for holding the shelf in horizontal position.

14. In a molding-machine, the combination of means for producing a molded article, and means for removing said article from the producing means, comprising a movable plate for receiving the molded article, a track adjacent thereto, a truck adapted to run on the track, said truck being provided with a shelf pivotally mounted thereon, said shelf comprising two side pieces with a space between them for the passage of the plate, and the truck having means for holding the shelf in horizontal position, and a movable plate for supporting the molded article.

15. A molding-machine, comprising means for applying pressure to molding material, and a mold having reciprocable walls each provided with guides for another wall, said guides comprising projections extending outwardly from each wall, the projection of one wall being contained between those of another.

16. A molding-machine, comprising means for applying pressure to molding material, a mold having reciprocable walls each provided with guides for another wall, and means for moving said walls after the pressure has been applied.

In testimony whereof I have signed my name to this specification in the presence of two subscribing witnesses.

CHARLES REED.

Witnesses:
 E. E. GUNCKEL,
 A. N. WILSON.